Jan. 4, 1966 D. A. MEIER 3,228,012

MAGNETIC DEVICE

Filed Feb. 27, 1959 3 Sheets-Sheet 1

INVENTOR:
Donal A. Meier
Louis A. Kline
By John J. Matlago
His Attorneys

Jan. 4, 1966

D. A. MEIER 3,228,012

MAGNETIC DEVICE

Filed Feb. 27, 1959

3 Sheets-Sheet 2

INVENTOR:
Donal A. Meier
By Louis A. Kline
John J. Matlago
His Attorneys

Jan. 4, 1966 D. A. MEIER 3,228,012

MAGNETIC DEVICE

Filed Feb. 27, 1959 3 Sheets-Sheet 3

INVENTOR:
Donal A. Meier
By Louis A. Kline
John J. Matlago
His Attorneys.

United States Patent Office 3,228,012

Patented Jan. 4, 1966

3,228,012
MAGNETIC DEVICE

Donal A. Meier, Inglewood, Calif., assignor to The National Cash Register Company, Dayton, Ohio, a corporation of Maryland Filed Feb. 27, 1959, Ser. No. 795,934
9 Claims. (Cl. 340—174)

This invention relates generally to ferromagnetic devices having two stable states of magnetic remanence, and more particularly relates to bistable magnetic devices adapted for employment in information storage and electrical switching apparatuses.

This application is a continuation-in-part of my copending application for U.S. Letters Patent Serial No. 728,739 which was filed Apr. 15, 1958 and now abandoned.

In the automatic control and computer arts, there are at present utilized as data storage devices, and in electrical switching devices, magnetic cores of generally toroidal configuration and having two stable states of magnetic remanence. These cores are caused to change magnetic state by action of electron flow through one or more conductors each of which is inductively linked with one or more of the cores. The inductive linkage is accomplished by winding one or more turns of a conductor on a core, the simplest and most widely practiced mode being to thread the conductor one or more times through the toroid. When sufficient coercive effort is exerted by the ampere-turns provided by the electron flow and conductor, the magnetic state of the core is reversed; and when reversal of state occurs, a voltage is induced in any other winding inductively linked to the core. Various modes of reversing the state of a core, and of inhibiting such action, are well known. For example, in the "coincident current" mode, two windings carry respective electron flows or "half currents," neither of which by itself is strong enough to reverse the state of the core but both of which when contemporaneously supplied do reverse the state or "turn over" the core. In the stated example, the current directions and winding directions are necessarily such that the two coercive efforts are additive. Continuing with the stated exemplary operation of conventional toroid-type cores, the "turning over" of a core by two contemporaneously acting "half currents" may be inhibited by utilizing a third winding similarly linked to the core and carrying an electric pulse or current providing a coercive effort substantially equal to that of a single one of the "half currents," but acting in opposition to the latter. These and other modes of operating the bistable magnetic cores are well known in the mentioned arts. Additional information concerning the prior art cores and operations thereof in various types of apparatus may, if necessary, be found in U.S. Patents Nos. 2,691,151 through 2,691,155; 2,809,783; and the literature therein cited.

Difficulty has been experienced in winding the conductors on the toroid-type cores which are the preferred magnetic devices in the mentioned arts, since the cores are of rather small dimensions, are quite fragile, and require the conductors to be carefully threaded therethrough. Further, it is difficult and in instances it is impossible to provide as many individual windings on a core as are desired; and this necessitates employment of an additional core, with attendant undesirable features. The present invention provides a bistable magnetic device possessed of unique qualities which admirably adapt it for electric switching and data-storing functions, and which does not suffer from the mentioned disadvantages inherent in toroid cores. In general, the magnetic device or element is of rod-like configuration, but quite unlike the well-known ferrite rod or "slug" cores well known in the electronic arts. The preferred form of magnetic structure according to the present invention comprises a stiff slender support in the form of a rod or monofil of non-magnetic material, upon which is firmly supported a relatively thin film of a bistable ferromagnetic material. Around the exterior cylindrical periphery of the rod-like magnetic device as many individual conductor windings as may be required or desired may be wound or positioned. The windings, generally in the form of concentric helical coils or solenoids, may be pre-formed and mounted upon the magnetic structure, or in some instances, wound in situ, as circumstances dictate. The slender rod-like magnetic device, which may within a rather short length form effective bistable core elements for ten or more separate switches or memory elements, may be much smaller in cross-section or diameter than a conventional toroid-type core, and hence may, in a single unitary device form bistable magnetic cores for ten, or twenty, or more switch elements or data-storage units. The non-magnetic rod-like support or base and the supported film of ferromagnetic material may vary in respect of individual and relative dimensions, materials, and other characteristics as hereinafter indicated. Variations may be made within the purview of the appended claims and general objects of the invention, a principal one of which objects is the provision of an improved magnetic data-storage and/or switching device. Another object of the invention is to provide an inexpensive bistable magnetic device for fast switching or data-storage operations. Another object of the invention is to provide an inexpensive bistable magnetic device. Another object of the invention is to provide a quickly replaceable ferromagnetic device for high speed switching or data-storage operations. Another object of the invention is to provide a bistable magnetic device having a "turn over" time of extremely short duration. Another object of the invention is to provide an acceptable bistable magnetic device of very small dimensions which may be easily equipped with multiple windings. Another object of the invention is to provide a bistable magnetic device to which additional windings may readily be added, and from which windings may readily be removed. Another object is to provide a simple magnetic data-storage device which obviates the disadvantages of toroid-core devices. Another object of the invention is to provide a bistable magnetic device which may be readily replaced without disturbance of the windings associated therewith. Many other objects and advantages of the invention will hereinafter become apparent or be made evident in the following description and claims. The description relates and refers to the accompanying drawings, in which:

Figure 13:
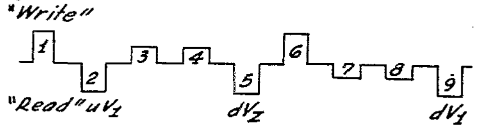
Figure 14:
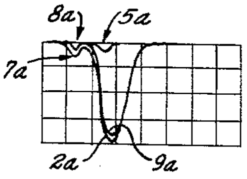

FIG. 13 is a waveform diagram illustrating a particular pattern of driving electric pulses employed in reversing the remanent state of a bistable magnetic device; and FIG. 14 is a set of electrical waveforms indicating relative magnitudes and durations of potentials existing at different times in coil windings on a magnetic device according to the invention when subjected to a sequence of driving pulses as indicated in FIG. 13.

Figure 1:
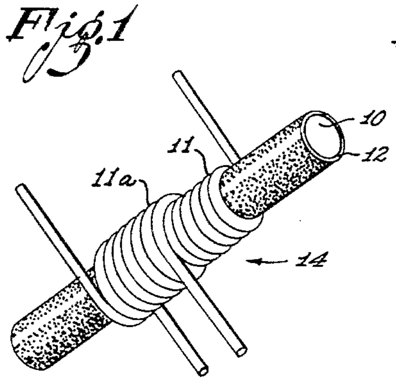
FIG. 1 is an exaggerated pictorial representation of a magnetic device incorporating features of the present invention, with a set of windings applied, the view being grossly enlarged for adequate and clear representation of the device.

In FIG. 1 an exemplary form of bistable magnetic device, with a set of two elementary windings 11 and 11*a*, is depicted greatly magnified. The magnetic device there shown is actually only of the order of twenty mils diameter and one-tenth inch long, yet is sufficient for formation of at least one storage or switching unit. However, as will hereinafter be made apparent, length of the magnetic device is not important provided it is at least approximately as great as that of the longest coil or solenoid to be inductively linked with the device. That is, for convenience in handling, replacement, etc., the rod-like part of the structure may in practice be several or many times longer than is actually required for adequate performance of magnetic functions. These factors will hereinafter be made apparent in greater detail. The structure shown in FIG. 1 comprises a rod-like base 10 of suitable material and form, which base in the illustrated embodiment is a fine-gauge monofilament or rod of glass, of round cross-section and of uniform diameter of the order of from five mils to thirty mils. While larger diameters of the base may be employed, devices produced with fine-gauge bases are more economical in requiring less expensive appurtenant electronic equipment. The base is substantialy free of internal strain such as torsional strain, and in use is kept free of undue strain caused by physical deformation of the base. Distributed over the cylindrical exterior of the base 10 is a layer of material comprising essentially a thin film or deposit of ferromagnetic material 12 which in the illustrated embodiment is an electrically deposited layer consisting essentially of iron and nickel, the proportion of which may vary somewhat but which in the example is 97.5 parts of iron to 2.5 parts of nickel, by weight. The ferromagnetic material is disposed over or upon the base 10 by electroplating according to the procedure hereinafter set out in detail. To facilitate the electrodeposition of the ferromagnetic layer, the base is chemically cleaned using conventional chemical cleaning solutions and procedures, and thoroughly rinsed; and is then sensitized by a stannous chloride solution spray and again rinsed prior to applying an extremely thin coating or layer of non-magnetic electrically conductive material, such as silver, to the base. Silvering is accomplished by simultaneously spraying a silver salt solution and a reducing solution onto the base. Acceptable materials for this are available under the names Peacock Silver Solution and Silver Reducing Solution, from Peacock Laboratories, Philadelphia, Pennsylvania. The conductive layer or film should be made as uniform as is practicable and should be kept to a minimum thickness which will still permit satisfactory electrodeposition of the ferromagnetic layer. As an aid in producing a more uniform deposit of silver, the base or rod can be rotated while being translated through the spray zone, and translated through the spray a plurality of times with intervening distilled water rinses to remove unreduced material, the number of passes and the speed thereof being regulated to produce the desired thickness of the deposit. The thickness of deposit necessary for satisfactory plating of magnetic material varies to some extent with the diameter of the base employed. Satisfactory base diameters are in the range from 5 mils to 30 mils, and silver layers of thickness and uniformity such as to give electrical resistance in the range from 1.5 ohms per inch to .4 ohm per inch have given satisfactory results in the succeeding electroplating process. The thickness of the film or layer of ferromagnetic material may be varied to some extent, depending upon the use to which the device is to be put. For example, very satisfactory coincident-current memory devices having low coercivity and a high degree of squareness of B–H characteristic are produced with a magnetic layer thickness of the order of 1500 A. to 3500 A. (angstrom units) as calculated by indirect methods, whereas a thickness of 1/16 mil as similarly measured still permits use of the device as a high speed magnetic switching device. Since speed of switching is dependent upon magnitude of the driving effort, economic considerations may dictate magnetic layer thickness of order lower than the maximum possible usable value. For electroplating the film or layer of magnetic material on the silvered base, a plating bath comprising 315 g./l. of $FeCl_2 \cdot 4H_2O$, 10 g./l. of $NiCl_2 \cdot 6H_2O$, 180 g./l. of $CaCl_2$, water to make 1 liter of solution, and sufficient HCl to bring the pH to from about 0.9 to about 1.0 is used. A plating current density of 90 amperes per square foot or less is satisfactory, it being understood that there is some current loss at the cathode terminal. Improved uniformity of the magnetic thin film may be attained by using an anode which encircles the rod-like base while permitting free movement of the bath solution. For example, the anode may be a nickel-wire helix of one inch diameter and one inch length. Further improvement in film uniformity may be attained by slow but uniform traversal of the support structure comprising the base axially through such a helical anode and permitting contact of the silvered base with the plating bath only within the space inside the anode.

For use in those applications of the invention directed to coincident-current operated magnetic data-storage devices per se (as contrasted to magnetic switching devices), improvement in squareness ($Bm/Br$) of the "hysteresis" or B–H loop of the magnetic material may be attained by limiting the plating current to a value not in excess of thirty amperes per square foot of exposed cathode and thereby limiting the thickness of the deposit to a value within the range of from 500 A. to 4000 A., preferably 3500 A., as determined by analytical methods of computing average thickness.

Coercivity of the electroplated thin magnetic film or layer increases as the thickness decreases below that thickness which provides an optimum value of $Bm/Br$, i.e., about 2500 A.–3500 A. average, and hence the film thickness to be produced will to a considerable degree be dependent not alone upon the use to which the bistable magnetic rod-like element is to be put but also upon the electrical characteristics of the solenoids and other circuitry hardware with which the element is to be associated. To form magnetic memory or magnetic switching units or apparatus, windings of electrically insulated wire, indicated generally at 14, are arranged for inductive coaction with the exemplary magnetic rod-like device, preferably in a manner hereinafter explained.

Figure 2:
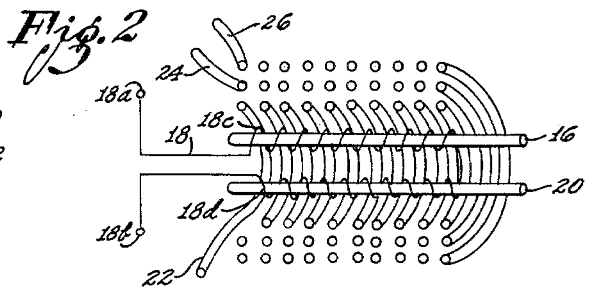
FIG. 2 is a view indicating a preferred exemplary mode of providing drive windings, sense winding, and inhibit windings for a magnetic device of the type indicated in FIG. 1 and especially adapted for switching functions, the representation being greatly enlarged and expanded and partly in section, for the sake of clarity.

In magnetic switching apparatus using the magnetic device, improved operating results may be obtained by employing a noise-cancelling type of coil form for the sense winding, and this is illustrated in an exemplary single unit according to the invention and depicted on a greatly enlarged scale (and for the sake of clarity of illustration partly in section) in FIG. 2. In that figure, 16 designates a magnetic device comprising a base and ferromagnetic layer and of the nature of the device shown in enlarged form encircled by coils in FIG. 1. The magnetic rod-like structure 16 is shown somewhat enlarged diametrically and greatly expanded longitudinally to facilitate showing winding details. Wound around device 16 is a sense winding 18 having terminals 18*a* and 18*b*. To provide improved noise-cancelling characteristics, winding 18 is as indicated formed into two coils, 18*c* and 18*d*, one positioned around device 16 and the other around a dummy mandrel or core 20 placed parallelly close alongside core 16. Dummy core 20 must either be non-magnetic or withdrawn after completion of the unit. Sense winding 18 thus comprises two generally parallelly disposed coils, one of which, 18*c*, normally encircles magnetic device 16 in a solenoid type of structure and the other of which, 18*d*, may be vacant or contain a dummy core 20. Encircling the two parallel coils of winding 18 are shown, diagrammatically and with portions removed in the interests of clarity, first and second substantially coaxial exemplary inhibit windings 22 and 24, and a concentrically disposed clock or drive winding 26, respectively. Other windings, which may include as many as thirty in an operable device, are not shown but may be applied or assembled by one or another of procedures hereinafter explained. It will be understood that in practice the coils are close-wound and of as small diameter as is practicable, although for clarity in illustration the coils are shown axially and diametrically expanded.

The several windings depicted in FIG. 2 may be prewound on mandrel means and preferably are fixed in place on a base or mount prior to insertion of the rod-like ferromagnetic device. This will be explained in detail in connection with FIGS. 7 and 8. The magnetic material has two opposite stable states of remanence, that is, it is bistable, and when an electric pulse is passed through the drive winding 26 and the magneic film or layer of device 16 is thereby driven from one remanent state to the opposite state, potentials are induced in the sense winding 18. One of the potentials is induced by change of magnetic flux in device 16, and other potentials induced are due to changes in magnetic flux in space-linkages. The latter potentials constitute or represent noise, and since the noise potentials induced in that coil 18*c* of the winding 18 encircling the device 16 are substantially equal in magnitude and opposite in direction to those induced in the other coil 18*d* of the winding, there is substantial cancellation of noise potentials. Since the ferromagnetic device 16 reposes in only one coil 18*c* of the sense winding 18, the principal potential produced in response to reversal of the magnetic state is not cancelled or nullified by opposing potential induced in the other coil of the winding; and this non-cancelled potential is the usable signal produced in the sense winding. As is evident, it is only when the device is magnetically "turned over," i.e., is completely reversed in magnetic state, that any appreciable signal potential is induced in the sense winding 18. This is due to the nature of the magnetization characteristics of the ferromagnetic film, which will be described in connection with FIGS. 9 and 12. The power and switching means for application of electric pulses or currents to drive coils are of any conventional suitable type and being well known in the art and not per se of the present invention are not herein described nor illustrated.

Figure 11:
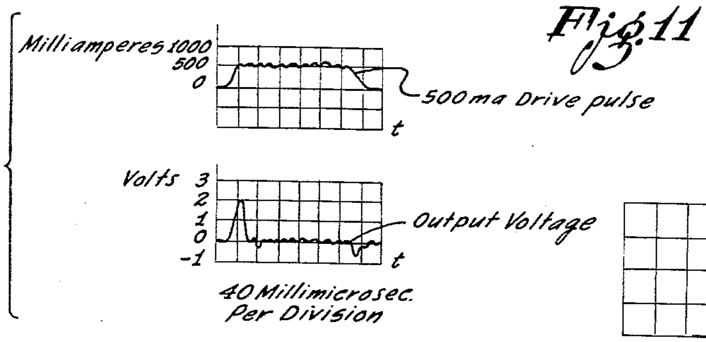
FIG. 11 is a set of waveform diagrams useful in explaining some characteristics of the invention.
Figure 10:
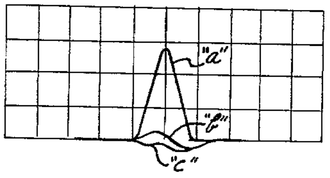
FIG. 10 is a set of waveforms illustrating certain features of the invention.
Figure 9:
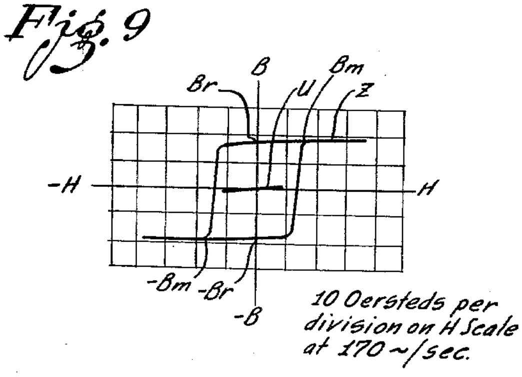
FIG. 9 is a series of magnetization curves of a bistable ferromagnetic device such as those illustrated in FIGS. 1 and 2.

When a drive pulse is applied through winding 26 (FIG. 2) and contemporaneously therewith an equally effective inhibit pulse is applied through an inhibit winding (such as 24) in inductive opposition to the drive pulse, only a relatively low-valued potential, termed an "inhibited" output potential, is induced in the sense winding 18. The relationships of this and other sense line potentials are indicated in FIG. 10, wherein waveform "*a*" indicates the sense winding output potential produced in response to turnover (change of state) of the magnetic film due to application of a clock or driving pulse through winding 26, "*b*" indicates the sense line potential produced as a result of contemporaneous application of a drive pulse through winding 26 and a substantially equal but opposing inhibit pulse through winding 24, and "*c*" indicates the sense winding potential produced in response to application of a pulse tending to drive device 16 toward that remanent state in which the device already exists. It is evident that the potential represented by waveform "*a*" is of such magnitude relative to the others indicated that it is easily distinguishable therefrom. In a typical operation of an exemplary device of the form shown in FIG. 2, using a device 16 having a base of 20 mil diameter with a layer of inon-nickel magnetic material (of 2.5 parts nickel, 97.5 parts iron composition by weight) and of an indirectly computed average thickness of about 3500 angstrom units, and with windings of ten turns each, application of a 500 ma. drive pulse to a drive winding provided a sense winding output pulse of 2 volts in a switching time less than 50 millimicroseconds. Fairly accurate representations of actual photographs of oscillograms of the exemplary current and voltage measurements conducted with the exemplary device are shown in FIG. 11. The B–H loop of the exemplary device is indicated in FIG. 9, it being noted that as there indicated the device has a coercivity of approximately fifteen oersteds and an excellent *Bm*/*Br* characteristic.

Figures 3, 4, 6:
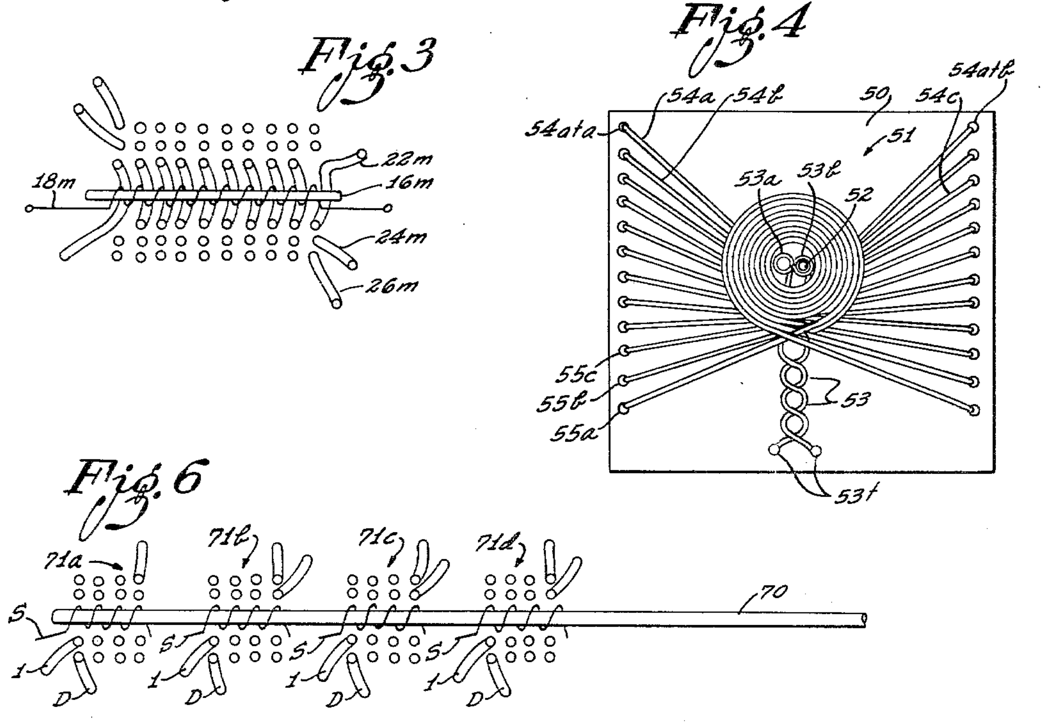
FIG. 3 is a view similar to FIG. 2 and similarly enlarged and expanded, illustrating a type of winding adapted for magnetic memory applications.
FIG. 4 is an expanded plan view, somewhat diagrammatic, of a bistable magnetic switching device structure having two centrally located reversely-wound sense-winding solenoids in either of which a rod-like magnetic device may be positioned, and comprising a plurality of drive and inhibit windings encircling the sense-winding solenoids.
FIG. 6 is a representation of a long bistable magnetic device according to one aspect of the invention, with a plurality of sets of windings each set encircling a respective portion of the magnetic rod-like device.

A modification of the device of FIG. 2 is illustrated in FIG. 3, the principal difference being that the sense winding, 18*m*, is formed as a single helical coil or solenoid encircling the rod-like magnetic device 16*m*. Drive winding 26*m* and inhibit windings 22*m* and 24*m* are similar to their counterparts in the device of FIG. 2, but obviously may be wound in coils of smaller diameter. This modification of the plural-winding bistable magnetic device is adaptable to those applications wherein sense line noise voltages are substantially reduced or eliminated by reason of the sense line being inductively linked in a noise-cancelling arrangement to two or more magnetic devices, as for example, in magnetic memory structures. This will become more evident upon consideration of an exemplary but elementary memory structure depicted in FIG. 7.

Figure 7:
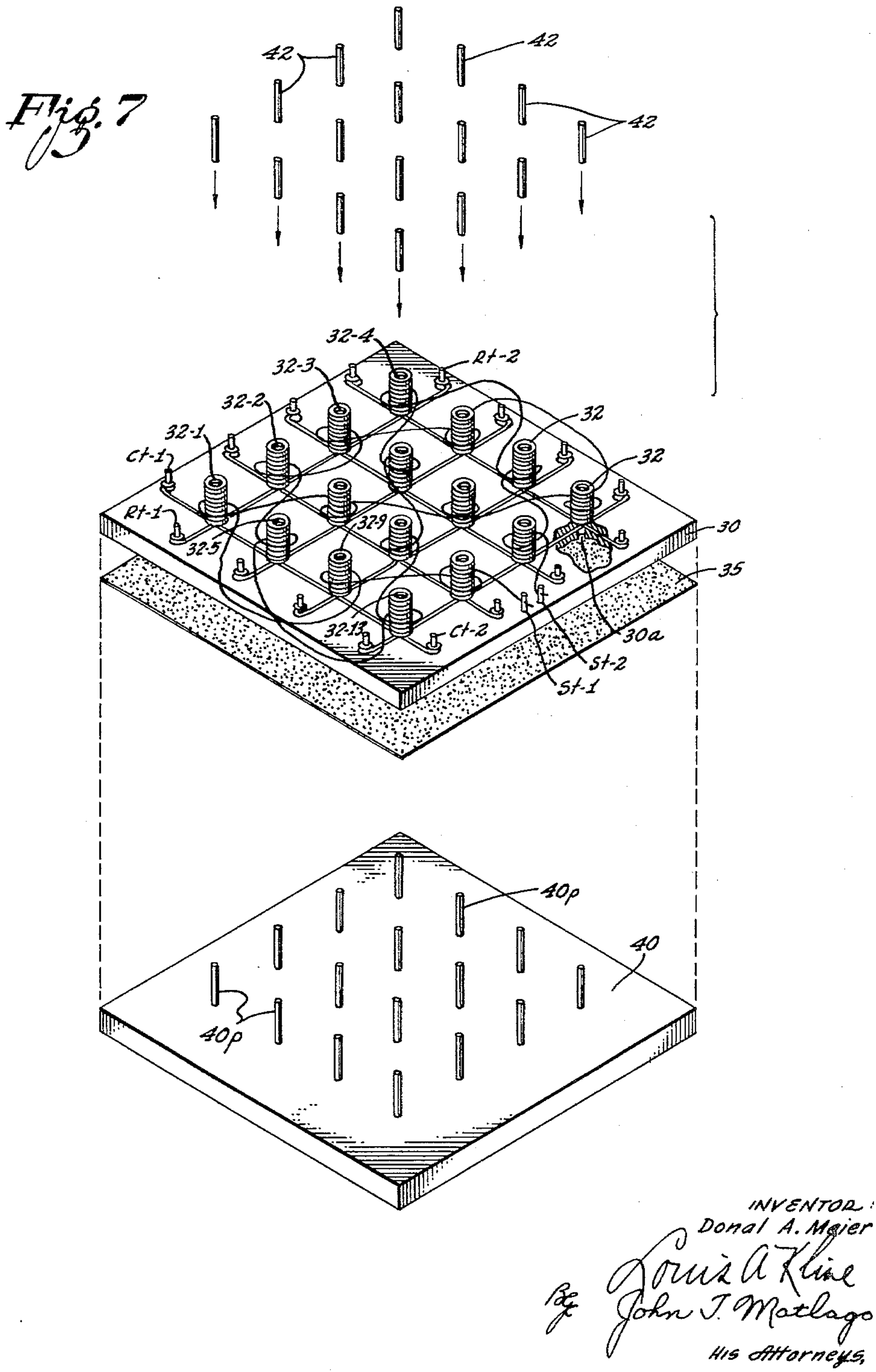
FIG. 7 is a view, in disassembled relationship, of a simple coil array supported on a base, with auxiliary apparatus which is useful in the processes of winding sets of coils or solenoids and for retaining ferromagnetic devices in place, and depicting a set of magnetic devices for the coils shown removed for facilitating explanation.
Figure 8:
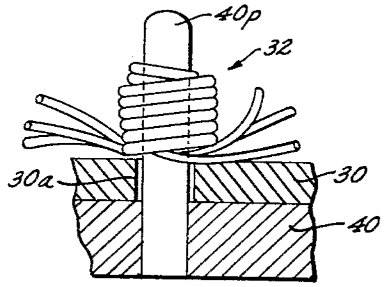
FIG. 8 is a fragmentary view to larger scale, partly in section, of structure similar to parts shown in FIG. 7 but with parts assembled for coil-winding operations.

Illustrative of another typical application of the rod-like magnetic device, and a simple mode of forming the windings, is the magnetic memory structure depicted in expanded form in FIG. 7. Therein, an integrated array or matrix of plural-winding units, mounted on a supporting base but with magnetic devices and retainer displaced, is depicted as being comprised in a simple coincident-current magnetic memory device having a single sense or read-out line and coils arranged in sets and groups. A support in the form of a plate 30 of suitable material, preferably of insulation, is provided upon which the memory array is adapted to repose. Plate 30 is provided with an array of apertures (such as that denoted by 30*a* in the broken-away part) each situated at a respective memory-element location and each of a diameter only slightly in excess of that of the rod-like ferromagnetic devices to be employed. Each of the apertures is spaced, dimensioned, and adapted to receive a respective one of rigid pins 40*p* fixedly mounted in complementary spaced relationship in a jig or winding plate 40. Pins 40*p* are of sufficient length and so disposed as to extend through respective ones of the apertures 30*a* and protrude above the upper surface of plate 30 when the two plates (30 and 40) are brought into juxtaposition, as indicated in the fragmentary partial-section view in FIG. 8. As may be determined by considering the latter figure, pins 40*p* serve as dummy cores or mandrels about which sense windings, half-drive windings, inhibit windings, etc., may be formed or wound, and may also serve as stable supports for coils 32 thus wound while the coils are cemented or otherwise suitably affixed to plate 30. Windings may be formed around pins 40*p* singly or in multiple and may be connected in suitable manner, each to another and/or to terminals, in accord with the design of the array and its function. For example, and as depicted in FIGS. 7 and 8, each of coil sets 32 comprises a set of three separate insulated windings, namely a row drive winding, a column drive winding, and a sense winding. The coil sets are, as shown in FIG. 7, arranged in rows, and in columns. The row drive windings of the coil sets in a respective row are connected in series to form a row group, and connected to row drive line terminals, so that, for example, the row windings of coil sets 32–1, 32–2, 32–3, and 32–4 form a group and are electrically in series and terminated at row drive line terminals R*t*–1 and R*t*–2. Similarly the column drive windings of coil sets 32–1, 32–5, 32–9, and 32–13 are connected as a group and electrically in series between column drive line terminals C*t*–1 and C*t*–2. The sense windings of all the coil sets are, in this specific example, connected in series (or formed from a continuous conductor) and terminated at sense line terminals S*t*–1 and S*t*–2. The sense windings preferably are wound as indicated, half of the windings formed clockwise and half counterclockwise, and connected in a "balanced" configuration whereby noise and capacitance effects are reduced to a minimum. In the interest of clarity of illustration the sense windings are shown as comprising but one turn each, but it should be understood that each may comprise more turns. The several terminals, such as C*t*–1, R*t*–1, and S*t*–1, are suitably affixed in plate 30 in a conventional known manner. After the several coil sets have been wound and terminated and cemented or otherwise secured to plate 30, plate 40 and pins 40*p* are moved away, as indicated in FIG. 7, leaving the hollow interiors of the coil units 32 unoccupied. Thereafter suitable lengths 42 of ferromagnetic device stock of the type previously described in connection with FIG. 1 are inserted, each in a respective coil unit. These rod-like magnetic devices 42 may be cemented to retain them in place, or they may be merely inserted so as to come to rest against a flat surface applied against the bottom of plate 30. For example, strips or a sheet of adhesive film 35 may be applied to the lower face of plate 30 for retention of the devices 42 in their respective coil units 32. Since the rod-like magnetic device stock is inexpensive, the devices 42 may be cut of sufficient length so that their lower ends rest on and adhere to the adhesive film 35 while the upper ends protrude from the respective coils 32. Hence it is evident that replacement of a magnetic device may readily be accomplished in but a moment of time.

In the preceding paragraph it has been made evident that the invention provides the advantage of a multi-unit array of bistable magnetic device-and-winding units in which the magnetic devices are readily replaceable and windings may readily be added to or removed from existing coil units. Also made evident are a mode and means for winding magnetic devices without involving risks of breaking or damaging the devices. In winding a group of prior-art toroidal cores, which are fragile, it is often the case that one of the cores is damaged, in which event the entire winding job must be recommenced, using a new core. This troublesome and expensive disadvantage is, as shown, obviated by the present invention. As many windings as may be required may be wound about a pin 40*p*; and in those instances in which a noise-canceling type of sense winding is desired, as shown in FIG. 2, the entire number of turns for one winding may be wound onto a pin 40*p*, then one-half of the turns removed and brought into position alongside the pin, a dummy core or pin inserted, and the other winding or windings wound around the composite structure. This is readily visualized upon reference to FIG. 2; and it is evident that after the entire multiple-winding coil unit is completed the dummy core may be removed and a rod-like ferromagnetic device employed in either coil or set of the sense winding turns. Also it should be noted that as many as thirty or more distinct windings may be wound into one coil unit for linking with a single rod-like magnetic device, which generally is not the case with toroidal cores of the sizes heretofore used in magnetic memory and magnetic switching devices. An example of this multiple-winding structure is explained in connection with FIG. 4.

In FIG. 4 there is indicated a base 50 of non-magnetic material adapted to support a bistable magnetic switching device indicated generally at 51 and comprising a rod-like bistable magnetic device 52 of the type previously described in connection with FIGS. 1 and 2. Magnetic device 52 is positioned in one of two oppositely wound coils 53*a*, 53*b* forming substantially similar but opposing portions of a sense winding 53 terminated at terminals 53*t*. These coils are similar to coils 18*c*, 18*d* of sense winding 18 in FIG. 2. Encircling the sense winding coils 53*a*, 53*b* is a set of drive windings including exemplary windings 54*a*, 54*b*, and 54*c*, and a set of inhibit windings including exemplary windings 55*a*, 55*b*, and 55*c*, all of the windings of two sets being suitably terminated at terminals such as 54*ata* and 54*atb*. The latter pair of terminals are exemplary and provide means for easy connection of winding 54*a* to an external circuit not a part of the present invention. The several windings may each comprise as many turns as is required to produce or secure the desired result, and each is inductively linked to bistable magnetic device 52. In a typical structure of the type illustrated, each winding comprises ten turns. It should be noted that the polarity of the output on sense line 53 may readily be reversed by the simple expedient of removing device 52 from coil 53*b* and inserting it in coil 53*a*, care being taken that the same directional relationship of the device to the coil unit is maintained. It may also be noted that the terminal configuration or layout for the windings is not critical; and that many more windings than are shown may successfully be linked to magnetic device 52. The structure depicted is useful in, for example, that class of computers and data processors in which inhibit core logic is employed. In that class of apparatus and operations, reversal of magnetic state of the device 52 produces an output (switching) potential in sense winding 53. The device is reversed in state by a "driving" current or pulse of proper amplitude through one of the driving or "drive" windings; but reversal of state may be inhibited (prevented) by contemporaneous passage of an inhibit current or pulse of substantially equal but opposite magnetizing effect, through one of the inhibit windings, as is well understood in the computer and automatic controls arts.

Figure 5:
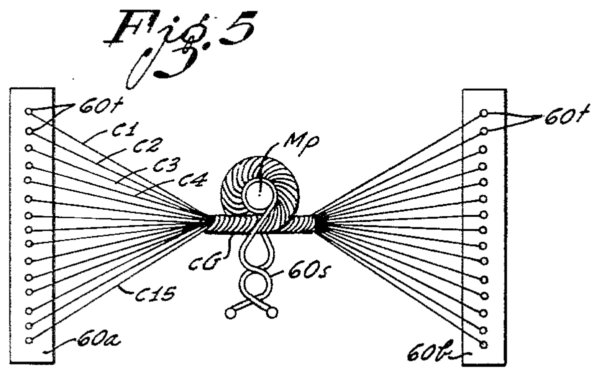
FIG. 5 is a diagram illustrating a mode of forming a plural-winding coil on a rod-like winding mandrel or on a magnetic device equipped with a sense winding.

An alternative mode of applying or forming a plurality of windings for insertion of a bistable ferromagnetic device according to the invention is illustrated in FIG. 5. The several individual conductors *c*1, *c*2, *c*3, etc., which are to form the windings are strung between respective pairs of teeth (such as teeth 60*t*) of a set of comb-like structures 60*a*, 60*b*, and relative rotation of the structures effected to twist the wires together as indicated at *c*G in the figure. The twisted group of conductors is then wound around a pin such as 40*p* (FIG. 7) or other suitable mandrel such as mandrel M*p*, upon which a sense winding 60*s* has previously been wound, enough turns of the conductor group being wound on to provide the required number of turns. After properly terminating the several conductors and suitably mounting the coil set, for example in a fashion suggested by FIG. 4, the unit is completed by replacement of the mandrel by a length of the rod-like bistable ferromagnetic stock. This "Litz" type of winding aids in providing the several windings with equal degrees of sensitivity. In this type of construction, as in that of FIG. 4, it is desirable that the sense line leads be twisted as indicated.

As indicated somewhat diagrammatically in FIG. 6, a plurality of separate sets of concentric coils may be suitably wound and arranged to utilize a single relatively long length of the basic magnetic rod-like stock such as was described in connection with FIG. 1. In FIG. 6, 70 is a single long bistable magnetic rod-like device comprising a core or base of glass rod or other suitable material, bearing a relatively uniform layer of silver substrate and a thin film of bistable ferromagnetic material such as the aforedescribed nickel iron material. Spaced apart a suitable distance and encircling device 70 are several plural-winding coil units 71*a*, 71*b*, etc., each of which units is in this illustrative example indicated as comprising respective windings D, I, and S. For the sake of clarity of illustration, windings I and D are shown diagrammatically and partly in section. The coil units may be wound either on a mandrel or on the rod-like structure itself, and are spaced apart on device 70 as may be desired but sufficiently far apart to avoid undesirable cross-induction effects. In practice this spacing may be very close due to the thinness of the ferromagnetic material.

In FIG. 9 there is reproduced a typical set of "hysteresis" curves secured by oscillographic recording of results of driving a bistable magnetic device such as is hereinbefore described in connection with FIG. 1. In this set of magnetization (B–H) curves, curve U illustrates the threshold curve in which a large value of H causes no change in the B value. Curve Z illustrates the large change in B caused by less than twice that value of H used in the case of curve U, the considerable degree of rectangularity of the saturation loop (Z) and the large threshold value of H in which (B) does not change is a feature of considerable merit in application of the device to memory and switching applications. As indicated in the figure, the $Bm/Br$ ratio (squareness) is in excess of 0.95.

The uncommonly high "turnover" speed of a magnetic device according to the invention is illustrated by actual oscillographic records which are reproduced in FIG. 11. Whereas commercial toroidal ferite cores are characterized by turnover times of the order of one-half microsecond to five microseconds, an exemplary device of the type illustrated in FIG. 2 and hereinbefore described is as shown by FIG. 11 characterized by a "turnover" time of not in excess of forty thousandths of a microsecond. As indicated in the drive pulse waveform in the upper portion of FIG. 11, the rise time of the particular exemplary drive pulse is recorded as being not in excess of twenty millimicroseconds, as measured with instrumentation which requires thirteen millimicroseconds time to commence sensing an increase. Accordingly, the actual rise of the exemplary drive pulse may be faster than as indicated in the oscillogram. Also the oscillogram which is reproduced in the lower portion of FIG. 11 must similarly be interpreted in the light of the deficiencies of the instrumentation in measuring or indicating waveforms of less than thirteen millimicroseconds duration. The reproduced oscillograms do, however, show magnetic reversal of the film as occurring in not more than forty thousandths of a microsecond, as previously noted. Hence the magnetic device of the invention is of the order of at least ten times faster in "turnover" than a conventional ferrite toroid.

Figure 12:
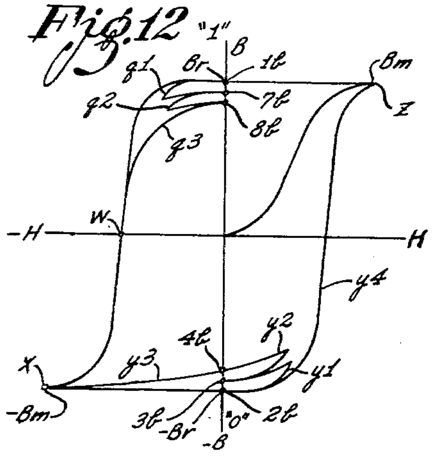
FIG. 12 is a view of a magnetization curve of an exemplary bistable magnetic device according to the invention, illustrating characteristics of the device during a particular pattern of applied drive pulses.

In FIGS. 12, 13, and 14 there are depicted diagrams illustrating operating characteristics and drive and output waveforms illustrative of operations conducted with an exemplary device according to the invention. An exemplary driving current waveform is depicted in FIG. 13, in which successive driving pulses are numbered 1, 2, . . . 8, 9. Pulses 1, 3, 4 and 6 are considered to be passed through a drive coil of a data-storage unit and to flow in the "write" direction, that is, to tend to drive the bistable magnetic film to that one of its stable magnetic states which will arbitrarily be designated "1." In other words, the tendency of pulse 1 is to store an information bit or digit in the device, and that is in this example accomplished since the pulse is considered to be of full current magnitude and capable of driving the device to "1" state. Pulses 3 and 4, while having the same tendency and acting in the same effective direction as pulse 1, are of only "half-current" magnitude and accordingly would not exert sufficient coercive effort to reverse the magnetic state of the device. Similarly, pulses 2, 5, 7, 8, and 9 are considered to be passed through a drive coil of the data-storage unit and to flow in the "read" direction, that is, to tend to drive the device to the opposite stable magnetic state which will arbitrarily be designated "0." Hence, assuming that pulse 1 has coerced the device to "1," pulse 2 of equal but opposite coercive effect will reverse the magnetic state of the device to "0" and produce a read-out of the digit in a sense line linked to the magnetic device of the unit. An oscillogram record of the resultant "undisturbed" read-out pulse ($uV_1$) corresponding to pulse 2 is reproduced at 2*a* in FIG. 14. Referring to FIG. 12 which illustrates diagrammatically the magnetic device magnetization operations resulting from application of the driving pulses indicated in FIG. 13, it is assumed that initially the device is driven to "1" state by pulse 1 and at the termination of the pulse the magnetization is relaxed at point 1*b* on the diagram. The effect of pulse 2 is to drive or coerce the device to "0" state via points W and X on the graph, with the magnetization relaxing to a remanent state at point 2*b* at the termination of the pulse. This maximum change of magnetization as the magnetic film is driven from "1" to "0" produces a maximum of sense-line output potential, as indicated by waveform 2*a* in the oscillogram of FIG. 14. The next pulse assumed to be applied to a driving winding is "half-current" pulse 3, which is of only about one-half the ampere-turns effect of pulse 1. Pulse 2 "drives" the magnetic device along a new magnetization curve or loop, indicated in laterally distorted form at *y*1 in FIG. 12; and at pulse termination the magnetization relaxes to a remanence value indicated at 3*b*. A following, second, "half-current" pulse (FIG. 13) carries the magnetization through another somewhat smaller loop or curve, indicated in somewhat exaggerated form by *y*2 in FIG. 12; the magnetization this time relaxing at a value indicated at 4*b* in FIG. 12. The next driving pulse, 5, is in the "read" direction, that is, tends to drive the core to a magnetic state indicative of "0," and accordingly the magnetization follows from 4*b* on the graph through a series of values represented by line *y*3, to point X. At termination of pulse 5 the magnetization again relaxes to a value indicated at 2*b*. The curves or loops *y*1, *y*2, and *y*3 have been shown in somewhat exaggerated form to obviate obliteration of detail and to facilitate the explanation.

During the change of magnetization of the device from the condition represented at point 4*b*, to that represented at point X, a potential represented by waveform 5*a*, in FIG. 14 is generated in the sense winding of the data-storage unit; and it should be noted that this potential is of low order and such as to permit easy electrical discrimination or separation from desired sense line potentials. A following drive pluse 6 (FIG. 13) in the "write" direction, drives the device through magnetization values represented by curve $y4$, between points $2b$ and Z, with the magnetization of the device again relaxing to a value represented by point $1b$ upon termination of the pulse. Two following successive half-current "read" pulses through a drive winding and represented at 7 and 8, respectively, in FIG. 13, drive the magnetization of the device through values represented by exaggerated loops $q1$ and $q2$ respectively, in FIG. 12, the magnetization relaxing at pulse termination to values represented somewhat out of proportion at $7b$ and $8b$, respectively. During these two magnetization changes, potentials of magnitudes indicated by waveforms $7a$ and $8a$, respectively, are induced in the sense line of the unit. Again, it will be noted that discrimination against potentials $7a$ and $8a$ may readily be effected with respect to desired potential $2a$. A following full current "read" pulse 9 ($d$VI) indicated in FIG. 13 and passed through a drive line of the unit, will drive the magnetization through values plotted as line $q3$, to point X on the graph of FIG. 12, the magnetization then relaxing to a value indicated by point $2b$. The change in flux during this change of state of the magnetic film is not as great as when the magnetization changed from the value indicated at point $1b$ to that at point X, and this is indicated by the slightly lower amplitude of the resultant sense line potential produced by the "turnover" and shown by waveform $9a$ of the oscillogram in FIG. 14. In the light of the preceding explanation, it is evident that even after repeated "half-drives" or "disturb" pulses have been applied to a magnetic device according to the invention, the device readily provides "full-drive" output potentials which are easily distinguished from the much lower amplitude "disturb" or "half-drive" sense line potentials.

The foregoing description makes evident the physical advantages in winding, mounting, etc., bistable ferromagnetic device and windings units according to the invention. While glass has been employed as the preferred material for the base or support for the magnetic film, other suitably stiff and preferably strain-free rod-like materials such as quartz, filaments and the like may be employed. Also, in the preferred exemplary embodiment, a specific magnetic material or composition was described, but it should be understood that variations from the exemplary magnetic film are permissible within the purview of the invention and within the scope of the appended claims. Possibly due to the fine particle size of the bistable ferromagnetic film and the fact the core or inner structure of the device is not a solid rod of ferromagnetic material, very low losses are experienced in driving the magnetic device in switching and memory operations, and very high turnover speeds may be attained. Thus the aforestated and other evident objects and advantages are attained by the invention. With the present disclosure in view, modifications of the invention will occur to those skilled in the art; and accordingly it is not desired to be limited to the exact details of the illustrated preferred embodiment.

What is claimed is:

1. A bistable magnetic device comprising: a 5 to 30 mil rod-like base structure of non-magnetic material, a cylindrical thin film of saturable ferromagnetic material having a substantially rectangular hysteresis characteristic deposited on said base structure with a thickness of the order of 500 to 4,000 angstroms, and means including a plurality of solenoids coupled to said thin film for setting the film during a writing operation to magnetic saturation in one or the other of the two axial directions substantially parallel to said base structure and during a reading operation for sensing in which axial direction the thin film is saturated by applying a substantially axial magnetic switching field thereto in a predetermined one of said axial directions, one of said plurality of solenoids serving as a sense winding during said reading operation to sense the particular axial direction in which said film is saturated.

2. Bistable magnetic data-storage means comprising: a 5 to 30 mil rod-like base structure of nonmagnetic material having a thickness of the order of 500 to 4,000 angstroms having a longitudinal axis, a cylindrical thin film of ferromagnetic material deposited on said base structure and having a substantially rectangular hysteresis characteristic in a direction substantially parallel to said longitudinal axis, and means inductively coupled to at least a portion of said thin film for applying a magnetic field thereto to switch the thin-film portion in a direction substantially parallel to said longitudinal axis during both reading and writing operations, said last mentioned means including a solenoid for sensing during said reading operation the particular longitudinal direction in which said film is saturated.

3. Bistable magnetic data-storage means comprising: a rod-like base structure of non-magnetic material having a diameter of the order of 5 to 30 mils, a cylindrical thin film of saturable ferromagnetic material deposited on said base structure with a thickness of the order of 500 to 4,000 angstroms, and means including a plurality of solenoidal windings encircling said base structure for applying a magnetic field to a predetermined portion of said thin film for switching the predetermined portion to a saturable state in either of the two opposite directions which are substantially parallel to the longitudinal axis of said base structure during both reading and writinig operations, one of said plurality of solenoids serving as a sense winding during said reading operation to sense the particular longitudinal direction in which said film is saturated.

4. The invention in accordance with claim 3 wherein said thin film has a thickness of the order of 2500 to 3500 angstroms.

5. The invention in accordance with claim 3 wherein said thin film has a coercivity of approximately 15 oersteds.

6. The invention in accordance with claim 3 wherein said thin film is a composition composed essentially of iron with a very minor proportion of nickel.

7. The invention in accordance with claim 6 wherein the composition of said thin film is approximately 97 parts iron and 3 parts nickel, by weight.

8. Bistable magnetic data-storage means comprising: a rod-like base structure of non-magnetic material having a diameter of the order of 5 to 30 mils, a continuous thin film of saturable ferromagnetic material coated on said base structure and having a thickness of the order of 500 to 4,000 angstroms, and means including a plurality of spaced apart solenoids encircling said base structure and arranged to permit magnetic fields to be applied to respective spaced apart portions of said thin film for saturation thereof in either of the two directions which are substantially parallel to the longitudinal axis of said base structure during both reading and writing operations, said last mentioned means including a solenioid sense winding coupled to each of said respective spaced apart portions of said thin film for sensing during said reading operation the particular longitudinal direction in which each of said respective spaced apart portions is saturated.

9. Bistable magnetic data-storage means comprising: a 5 to 30 mil rod-like base structure of non-magnetic material, a thin film of saturable ferromagnetic material having a substantially rectangular hysteresis characteristic and a thickness of the order of 500 to 4,000 angstroms deposited on said base structure, and means including a plurality of solenoids encircling said base structure for applying a substantially axial magnetic field to a predetermined portion of the thin film deposited on the base structure during both reading and writing operations so as to cause saturation of the predetermined portion in one or the other longitudinal direction parallel to the axis of said rod-like base structure, one of the plurality of solenoids serving as a sense winding to sense changes in the direction of saturation of said predetermined portion.

References Cited by the Examiner

UNITED STATES PATENTS

| | | | |
|---|---|---|---|
| 2,792,563 | 5/1957 | Rajchman | 340—174 |
| 2,811,652 | 10/1957 | Lipkin | 340—174 |
| 2,878,463 | 3/1959 | Austin | 340—174 |
| 2,997,695 | 8/1961 | Conger et al. | 340—174 |
| 3,069,661 | 12/1962 | Gianola | 340—174 |
| 3,083,353 | 3/1963 | Bobeck | 340—174 |

OTHER REFERENCES

Publication I: "Preparation of Thin Magnetic Films and

Their Properties," Blois, Journal of Applied Physics, August 1955, pp. 975–980.

Publication II: "Thin Films, Memory Elements," Electrical Manufacturing, January 1958, pp. 95–98.

Publication III: "A Compact Coincident—Current Memory," A. V. Pohm, S. M. Rubens, Proceedings of the Eastern Joint Computer Conference, December 1956, pp. 120–123.

Publication IV: "The Twistor," A. H. Bobeck, Bell System Technical Journal, vol. 36, No. 6, November 1957, pp. 1319–1340.

IRVING L. SRAGOW, *Primary Examiner.*

EVERETT R. REYNOLDS, *Examiner.*